(12) United States Patent
Daigle

(10) Patent No.: US 9,871,914 B2
(45) Date of Patent: *Jan. 16, 2018

(54) METHODS, SYSTEMS, AND PRODUCTS FOR PROCESSING COMMUNICATIONS

(71) Applicant: AT&T INTELLECTUAL PROPERTY I, LP, Atlanta, GA (US)

(72) Inventor: Brian K. Daigle, Marietta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/130,052

(22) Filed: Apr. 15, 2016

(65) Prior Publication Data

US 2016/0234382 A1    Aug. 11, 2016

Related U.S. Application Data

(63) Continuation of application No. 14/340,604, filed on Jul. 25, 2014, now Pat. No. 9,344,867, which is a continuation of application No. 13/745,760, filed on Jan. 19, 2013, now Pat. No. 8,824,650, which is a continuation of application No. 12/549,522, filed on Aug. 28, 2009, now Pat. No. 8,385,529, which is a continuation of application No. 11/321,097, filed on Dec. 29, 2005, now Pat. No. 7,606,357.

(51) Int. Cl.
| | |
|---|---|
| H04M 3/42 | (2006.01) |
| H04M 1/2745 | (2006.01) |
| H04M 3/46 | (2006.01) |
| H04W 4/16 | (2009.01) |
| H04W 12/02 | (2009.01) |
| H04M 1/57 | (2006.01) |

(52) U.S. Cl.
CPC . *H04M 3/42093* (2013.01); *H04M 1/274575* (2013.01); *H04M 1/571* (2013.01); *H04M 3/42008* (2013.01); *H04M 3/42068* (2013.01); *H04M 3/465* (2013.01); *H04W 4/16* (2013.01); *H04W 12/02* (2013.01)

(58) Field of Classification Search
None
See application file for complete search history.

(56) References Cited

U.S. PATENT DOCUMENTS

| | | | |
|---|---|---|---|
| 5,058,152 | A | 10/1991 | Solomon et al. |
| 5,537,657 | A | 7/1996 | King, III et al. |
| 5,864,612 | A | 1/1999 | Strauss et al. |
| 5,875,240 | A | 2/1999 | Silverman |
| 5,901,209 | A | 5/1999 | Tannenbaum et al. |
| 6,529,500 | B1 | 3/2003 | Pandharipande |
| 6,603,977 | B1 | 8/2003 | Walsh |
| 6,661,785 | B1 | 12/2003 | Zhang |
| 6,665,611 | B1 | 12/2003 | Oran |

(Continued)

*Primary Examiner* — Maria El-Zoobi
(74) *Attorney, Agent, or Firm* — Scott P. Zimmerman, PLLC

(57) ABSTRACT

Methods, systems, and products provide called party identification to a calling party. A communication is processed from a calling communications address to one of a plurality of communications addresses associated with a simultaneous ring. When an answer is detected at one of the plurality of communications addresses, an answering communications address is sent to the calling communications address.

20 Claims, 13 Drawing Sheets

(56) References Cited

U.S. PATENT DOCUMENTS

| | | |
|---|---|---|
| 6,674,745 B1 | 1/2004 | Schuster |
| 6,678,357 B2 | 1/2004 | Stumer |
| 6,694,004 B1 | 2/2004 | Knoerle et al. |
| 6,868,074 B1 | 3/2005 | Hanson |
| 6,912,399 B2 | 6/2005 | Zirul |
| 6,978,004 B1 | 12/2005 | Levine |
| 7,391,761 B1 | 6/2008 | Ruckart |
| 7,551,731 B2 | 6/2009 | Durga et al. |
| 2002/0072348 A1 | 6/2002 | Wheeler |
| 2002/0160745 A1 | 10/2002 | Wang |
| 2003/0043974 A1 | 3/2003 | Emerson, III |
| 2003/0063733 A1* | 4/2003 | Levine .................. H04M 3/465 379/211.04 |
| 2003/0087652 A1 | 5/2003 | Simon |
| 2004/0101123 A1 | 5/2004 | Garcia |
| 2004/0140928 A1 | 7/2004 | Cleghorn |
| 2004/0209605 A1 | 10/2004 | Urban et al. |
| 2005/0047574 A1 | 3/2005 | Reid |
| 2005/0063529 A1 | 3/2005 | Meldrum et al. |
| 2005/0232243 A1 | 10/2005 | Adamczyk et al. |
| 2005/0249195 A1 | 11/2005 | Simpson |
| 2005/0250468 A1 | 11/2005 | Lu |
| 2007/0041550 A1* | 2/2007 | McLarty ........... H04M 3/42255 379/211.02 |
| 2007/0147348 A1 | 6/2007 | Lu |
| 2008/0247523 A1 | 10/2008 | Ying et al. |

* cited by examiner

METHODS, SYSTEMS, AND PRODUCTS FOR PROCESSING COMMUNICATIONS

CROSS-REFERENCE TO RELATED APPLICATIONS

This application is a continuation of and claims priority to U.S. patent application Ser. No. 14/340,604, filed Jul. 25, 2014 and since issued as U.S. Pat. No. 9,344,867, which is a continuation of U.S. patent application Ser. No. 13/745,760, filed Jan. 19, 2013, now U.S. Pat. No. 8,824,650, which is a continuation of and claims priority to U.S. patent application Ser. No. 12/549,522, filed Aug. 28, 2009, now U.S. Pat. No. 8,385,529, which is a continuation of and claims priority to U.S. patent application Ser. No. 11/321,097, filed Dec. 29, 2005, now U.S. Pat. No. 7,606,357. The contents of each of the foregoing applications are hereby incorporated by reference into this application as if set forth herein in full.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE DISCLOSURE

This application generally relates to field of communications. More particularly, this invention relates to a system and method for called party identification of a communications address that answers an incoming communication to a simultaneous ring service.

Telecommunications has experienced explosive growth, and more growth is planned as telecommunication access and numerous communications devices improve. This explosive growth is revolutionizing special services offered to subscribing customers. Of the special service offerings, the simultaneous ring service is relevant to this discussion. Today, more and more individuals (also referred to herein as "subscribers," "users," and "customers") have different telephone numbers, such as, for example, different telephone numbers for his/her home, his/her office, his/her cellular phone, and his/her pager. A calling party is often required to dial or otherwise initiate multiple communications in order to reach the individual—that is, the calling party calls a first telephone number and waits to see if the individual answers the call. If the call is not answered, then the calling party calls a second telephone number and again waits to see if the individual answers the call. This continues with a third telephone number, a fourth telephone number, and so on until the call attempt is answered or until the calling party gives up trying to contact the called party. Consequently, this process is often frustrating for the calling party because the calling party must initiate a series of different calls to different telephone numbers before reaching the calling party. And, called parties may also be frustrated because despite the efforts of the calling party to contact the individual, the end result may still be a missed call.

Conventional simultaneous ring services provides a ringing tone on a dialed telephone number of the incoming call and on selected secondary telephone numbers. Such a service connects the calling party to a telephone that is answered first. As known by those of ordinary skill in the art, these simultaneous ring services may be extended to ring many different telephone numbers at the same time or alternatively, to ring a series of telephone numbers in rapid succession. Although such simultaneous ring services have provided some convenience in reaching the called party, there are problems with implementation, with integration with other service offerings, and with communications to evolving communications systems.

SUMMARY

The aforementioned problems, and other problems, are reduced, according to exemplary embodiments, by methods, systems, and devices that provide a simultaneous ring service that identifies an actual communications address of an answering communications device of a called party. In some of the exemplary embodiments, a calling party uses a communications device that includes a computer program product—Simultaneous Ring Called Party Identification Module—that requests a Simultaneous Ring Called Party Identification signal that includes a communications address of an answering communications device to the incoming call by the calling party (e.g., similar to pinging for an incoming calling line identification (ICLID) signal or other identifier of the answering communications address). In further exemplary embodiments, the Simultaneous Ring Called Party Identification signal may include a universal communications address (e.g., a single telephone number that is associated with multiple communications addresses of a called party using a simultaneous ringing service, a name such as a company name that is associated with multiple communications addresses of the called party, and other identifiers). The Simultaneous Ring Called Party Identification signal may be associated with multiple communications devices of the answering communications address, such as a POTS phone and a computer coupled with a modem communicating with a telecommunications network from the same switch (e.g., Service Node). In still further embodiments, the answering called party may control communication of the actual communication address when there is an incoming communication to the called party's simultaneous ring service number and may also communicate alternate information, such as, for example, a preferred communications address for future communications to the called party. The Simultaneous Ring Called Party Identification signal may further include an identifier of the called party's communications device answering the incoming communication to the simultaneous ring service address (e.g., POTS phone, cellular phone, personal digital assistant, VOIP phone, etc.). Alternatively, the calling party may use a conventional telephone to access a communications network having a server-component Simultaneous Ring Called Party Identification Module, activate Simultaneous Ring Called Party Identification services, provide communications instructions associated with each called party's communications address associated with the Simultaneous Ring Called Party Identification services, and communicate the Simultaneous Ring Called Party Identification signal to the calling party's communications address. The Simultaneous Ring Called Party Identification signal may include text, video, voice, and/or digital data. After the Simultaneous Ring Called Party Identification signal is communicated to the calling party's communications address, the calling party may act on this information. For example, the calling party may review the Simultaneous Ring Called Party Identification signal, forward the Simultaneous Ring Called Party Identification signal, store the Simultaneous Ring Called Party Identification signal, ignore the Simultaneous Ring Called Party Identification signal, and/or other handling options.

Additionally, a telecommunications customer may subscribe to a blocking service to decline, disable, or otherwise prevent communication of the Simultaneous Ring Called Party Identification signal.

The exemplary embodiments also include a computer program product for Simultaneous Ring Called Party Identification services. The computer program product comprises a computer-readable medium and a Simultaneous Ring Called Party Identification Module stored on the computer-readable medium. The Simultaneous Ring Called Party Identification Module includes computer code that accesses, requests, and/or generates the actual communications address or other identifier of the called party answering an incoming communication to a simultaneous ring line (e.g., a communications address subscribing to the simultaneous ring service). The Simultaneous Ring Called Party Identification Module communicates the actual communications address, the simultaneous ring communications address, or an alternate identifier (including an alternate communications address of the called party) as described in further detail below.

Other systems, methods, and/or computer program products according to the exemplary embodiments will be or become apparent to one with skill in the art upon review of the following drawings and detailed description. It is intended that all such additional systems, methods, and/or computer program products be included within and protected by this description and be within the scope of this invention.

BRIEF DESCRIPTION OF THE DRAWINGS

These and other features, aspects, and advantages of the exemplary embodiments are better understood when the following description is read with reference to the accompanying drawings, wherein.

DETAILED DESCRIPTION OF THE DRAWINGS

Figure 1:
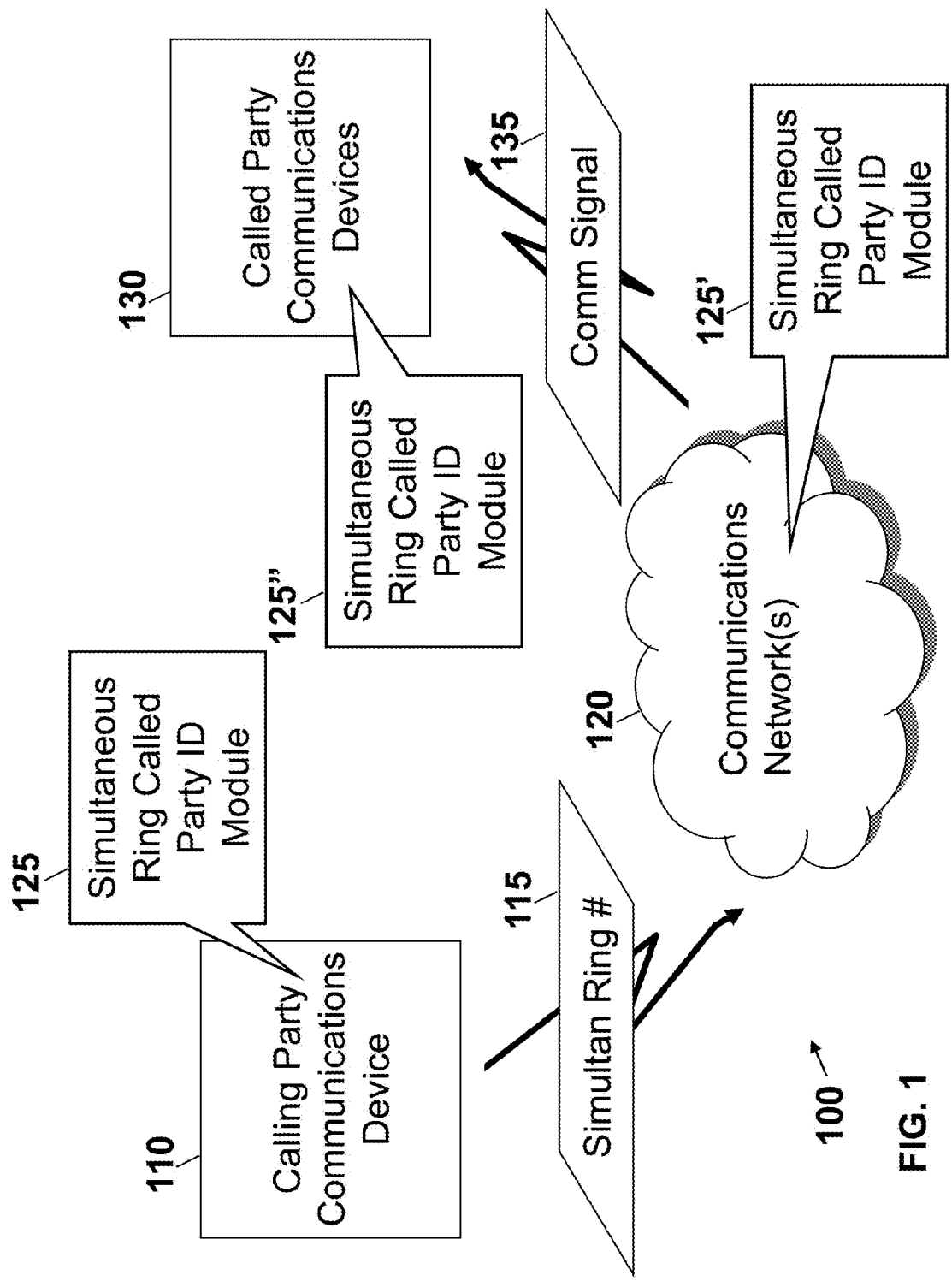
FIG. 1 is a simplified schematic of a Simultaneous Ring Called Party Identification communications system according to some of the exemplary embodiments.

The exemplary embodiments now will be described more fully hereinafter with reference to the accompanying drawings. The reader should recognize, however, that the exemplary embodiments may be embodied in many different forms and should not be construed as limited to the embodiments set forth herein. These embodiments are provided so that this disclosure will be thorough and complete and will fully convey the scope of the exemplary embodiments. Moreover, all statements herein reciting exemplary embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods of the exemplary embodiments. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing the exemplary embodiments. Those of ordinary skill in the art further understand that the exemplary hardware, software, processes, methods, and/or operating systems described herein are for illustrative purposes and, thus, are not intended to be limited to any particular named manufacturer.

The exemplary embodiments describe methods, systems, and devices that provide Simultaneous Ring Called Party Identification services. The Simultaneous Ring Called Party Identification services operate with different communications devices and communications networks to generate, enable, and/or communicate a Simultaneous Ring Called Party Identifier that identifies an actual communications address (or other called party identifier) of an answering communications device in a simultaneous ring service that includes at least two communications addresses. In some of the exemplary embodiments, a calling party uses a communications device that includes a computer program product—a Simultaneous Ring Called Party Identification Module—that requests a Simultaneous Ring Called Party Identification signal that includes a communications address of an answering communications device to the incoming call by the calling party (e g, similar to pinging for an incoming calling line identification (ICLID) signal or other identifier of the answering communications address). The Simultaneous Ring Called Party Identification signal may be associated with multiple communications devices of the answering communications address, such as a POTS phone and a computer coupled with a modem communicating with a telecommunications network from the same switch (e.g., Service Node). In still further embodiments, the answering communications device includes a Simultaneous Ring Called Party Identification Module, and, the answering called party can control communication of the Simultaneous Ring Called Party ID when there is an incoming communication to the called party's simultaneous ring service number. For example, the called party may configure the software product to automatically communicate the actual, answering communications address or to communicate an alternate identifier of the called party (e.g., the called party's name and general location, such as, for example, "John Johnson Home", a different communications address for a future communication to the called party, and others). Further, the Simultaneous Ring Called Party Identification signal may further associate multiple communications addresses and/or multiple communications devices (e.g., POTS phone, cellular phone, personal digital assistant, VOIP phone, etc.) used by the subscriber (also referred to as the "called party" or the "user"). And, the Simultaneous Ring Called Party Identification Module automates configuration and communication of the Simultaneous Ring Called Party Identification signal (also referred to as a "Simultaneous Ring Called ID") to associated multiple communications addresses and/or multiple communications devices.

Alternatively, the calling party may use a conventional telephone to access a communications network having a server-component Simultaneous Ring Called Party Identification Module, activate Simultaneous Ring Called Party Identification services, provide communications instructions associated with each called party's communications address associated with the Simultaneous Ring Called Party Identification services, and communicate the Simultaneous Ring Called Party Identification signal to the calling party's communications address. The Simultaneous Ring Called Party Identification signal may include text, video, voice, and/or digital data. After the Simultaneous Ring Called Party Identification signal is communicated to the calling party's communications address, the calling party may act on this information. For example, the calling party may review the Simultaneous Ring Called Party Identification signal, forward the Simultaneous Ring Called Party Identification signal, store the Simultaneous Ring Called Party Identification signal, ignore the Simultaneous Ring Called Party Identification signal, and/or other handling options.

Additionally, a telecommunications customer may subscribe to a blocking service to decline, disable, or otherwise prevent communication of the Simultaneous Ring Called Party Identification signal. Still further, if the calling party blocks communication of the Simultaneous Ring Called Party Identification signal, the server-component software residing on the communications network(s), may communicate a message (e.g., communications failure of the Simultaneous Ring Called Party Identification signal) to the answering communications address (or alternate further communications address) that the calling party blocks or does not accept requests for the actual communications address answering the incoming communication to a simultaneous ring service line (or alternate simultaneous ring communications address).

Some advantages of Simultaneous Ring Called Party Identification service include the convenience of identifying the actual communications address of the called party answering an incoming communication to a simultaneous ring line, providing an alternate communications address for future communications with the called party, or providing an alternate identifier of the called party answering the incoming communication. Further advantages include configuring the Simultaneous Ring Called ID for a plurality of different types of communications devices that may used by the calling party (regardless of the location of the communications device). And, still further advantages include additional services for the calling party to control further communications, storage, blocking, and/or management of the Simultaneous Called Party Identification signal.

As used herein, the term "communications device" includes wired and wireless communications devices, such as a mobile phone, a wireless phone, a WAP phone, a satellite phone, a computer, a modem, a pager, a digital music device, a digital recording device, a personal digital assistant, an interactive television, a digital signal processor, and a Global Positioning System device. The communications device may include any computer, peripheral device, camera, modem, storage device, telephone, personal digital assistant, and/or mobile phone. The communications network may include coaxial cables, copper wires, fiber optic lines, and/or hybrid-coaxial lines. The communications network may be a cable network operating in the radio-frequency domain and/or the Internet Protocol (IP) domain. The communications network, however, may also include a distributed computing network, such as the Internet (sometimes alternatively known as the "World Wide Web"), an intranet, a local-area network (LAN), and/or a wide-area network (WAN). The communications network may even include wireless portions utilizing any portion of the electromagnetic spectrum and any signaling standard (such as the I.E.E.E. 802 family of standards).

Further, as used herein, the term "data" includes electronic information, such as, for example facsimile, electronic mail (e-mail), text, video, audio, and/or voice in a variety of formats, such as dual tone multi-frequency, digital, analog, and/or others. Additionally, the data may include: (1) executable programs, such as a software application, (2) an address, location, and/or other identifier of the storage location for the data, (3) integrated or otherwise combined files, such as a grouping of destination communications addresses associated with the calling party, and/or (4) profiles associated with the Simultaneous Ring Called Party Identification signal, including configuration, authenticity, security, and others. Still further, the term "processing," as used herein, encompasses every event from the time the calling party communications device goes off-hook to the termination of the communications signal (e.g., hanging up the telephone call). "Processing" of the communications signal includes routing a voice path and signaling setup and intelligence (e.g., Local Number Portability queries, queries to retrieve Calling Name/Number information, intelligence queries by the AIN components, and standard signaling messages to determine communications routing paths). The term "processing" also includes monitoring an established communications link for possible entry of a simultaneous ring called party identification signal, switch hook flash, other events that indicate a party on the telephone call has requested an action and/or communication of the simultaneous ring called party identification Finally, in various embodiments, the data (e.g., Simultaneous Ring Called Party Identification signal and/or communications instructions) may be stored by the communications network, a peripheral storage device connected to the communications network, the communications device of the calling party, one or more of the communications devices of the called party, and/or other connected networks.

Referring now to the figures, FIG. 1 illustrates a schematic of a Simultaneous Ring Called Party Identification communications system 100 including at least one calling party's communications device 110 having a Simultaneous Ring Called Party Identification Module 125, at least one communications network 120 having a server-component of the Simultaneous Ring Called Party Identification Module 125', and a plurality of calling party's communications devices 130 having the Simultaneous Ring Called Party Identification Module 125". In general, a calling party uses his/her communications devices 110 to enter or otherwise input the simultaneous ring communications address 115 (referred to as "Simultan Ring #" in FIG. 1) and initiate an incoming communication to the called party. The communications network(s) detects and decodes the incoming communication with the simultaneous ring communications address 115, associates a plurality of communications addresses subscribing to a simultaneous ring service for the simultaneous ring communications address, and simultaneously communicates an incoming communications signal 135 (or alternatively an alert) to each called party's communications device associated with the plurality of communications addresses 130. The Simultaneous Ring Called Party Identification Module 125, 125', and 125" may reside on the calling party's communications device, a server-component of the communications network 120, and/or the called party's communications devices 130.

Figure 2:
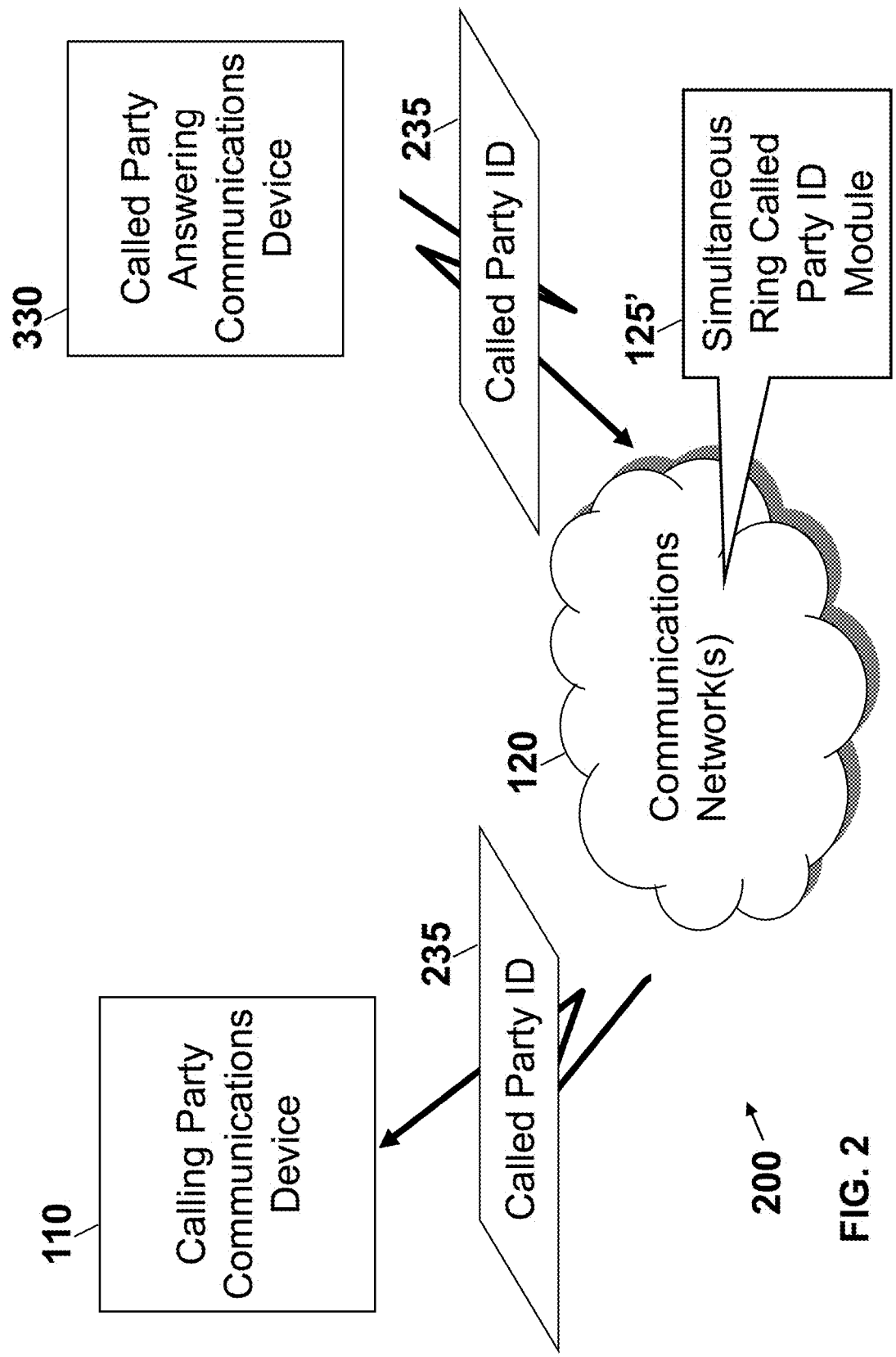
FIG. 2 is another simplified schematic of a Simultaneous Ring Called Party Identification communications system according to some of the exemplary embodiments.

As shown in FIG. 2, a called party answers the incoming communication with a called party's answering communications device(s) 330. The Simultaneous Ring Called Party Identification Module 125' of the communications network initiates or otherwise establishes a communications connection with the answering communications device(s) 330 and accesses a Simultaneous Ring Called Party Identification signal 235 (referred to as a "Called Party ID" in FIG. 2) of the answering communications device(s) 330. The Simultaneous Ring Called Party Identification Module 125' residing on the server component of the communications network 120 decodes the Called Party ID 235, compares the Called Party ID 235 with Simultaneous Ring Called Party Identification data (also referred to as a "Simultaneous Ring Called Party Identification profile") stored in one or more databases of the communications network 120 to determine communications instructions or alternate called party identification information such as an alternate communications address for future communications, determines whether the calling party's communications address accepts the Simultaneous Ring Called Party Identification signal 235, and/or presentation capabilities of the calling party's communications device 110.

The communications network 120 communicates the Simultaneous Called Party Identification Signal 235 to the calling party's communications device 110 (or alternatively to another device coupled with the calling party's communications device, such as a caller identification display device). The Simultaneous Called Party Identification signal 235 is an actual communications address or alternate called party identifier of the communications device(s) 330 answering the incoming communication 135 to a simultaneous ring line. As known by one of ordinary skill in the art, a simultaneous ring line is a universal identifier of the called party (e.g., a single telephone number that is associated with multiple communications addresses of the subscriber, a name such as a company name that is associated with multiple communications addresses of the subscriber, etc.). The Simultaneous Called Party Identification signal 235 is associated with a communications address that answers (e.g., a telephone line that goes off hook) the incoming communication 135 and may include multiple communications devices of the communications address. The Simultaneous Ring Called Party Identification signal 235 may further include an alternate called party identifier of the answering communications address, such as a name of called party, an alternate communications address for receiving a future communication, an identifier of the called party's communications device (e.g., POTS phone, cellular phone, personal digital assistant, VOIP phone, and others), and other identifiers of the called party.

Figure 3:
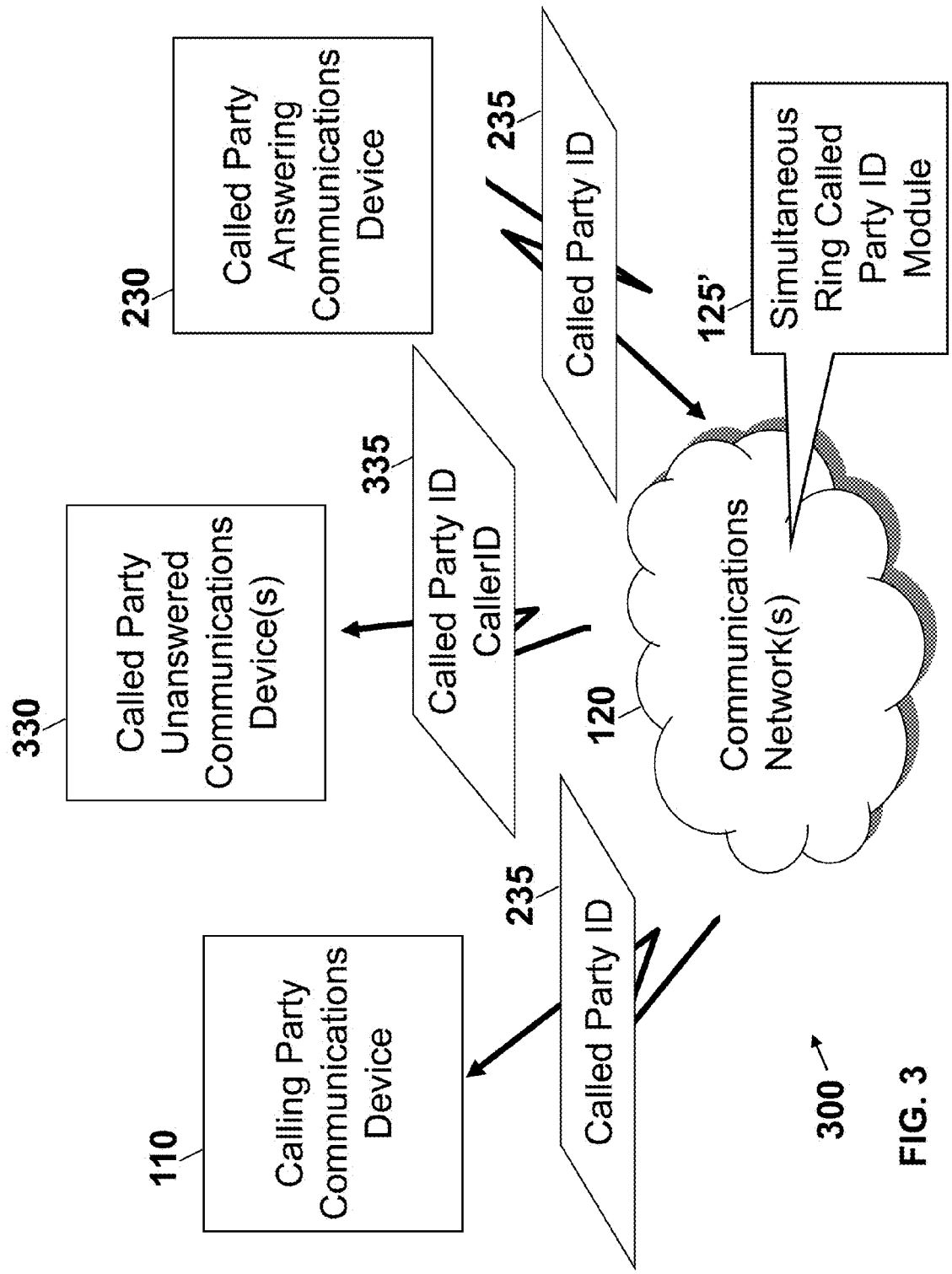
FIG. 3 is still another simplified schematic of a Simultaneous Ring Called Party Identification communications system according to some of the exemplary embodiments.

FIG. 3 illustrates a Simultaneous Ring Called Party Identification communications system 300 similar to the Simultaneous Ring Called Party Identification communications system 200 of FIG. 2; however, the Simultaneous Ring Called Party Identification communications system 300 further includes a message shown as "Called Party ID, CallerID" 335 communicated from the communications network 120 to another communications address associated with the simultaneous ring service that does not answer the incoming communication 330 (shown as "Called Party Unanswered Communications Device"). Similar to the communication of the Called Party ID 235 to the calling party's communications device, the communications network 120 communicates the Called Party ID, CallerID 335 to the Called Party Unanswered Communications device(s) 330 (or alternatively to another device coupled with the called party's unanswered communications device, such as a caller identification display device). The Called Party ID, CallerID 335 is another communications signal that includes both (1) the actual communications address or alternate called party identifier of the communications device(s) 330 answering the incoming communication 135 to a simultaneous ring line and (2) the communications address or alternate identifier of the communications address of the calling party 110 (e.g., an ICLID signal of the calling party's communications device 110). The Simultaneous Ring Called Party Identification Module 125' of the communications network accesses a Simultaneous Ring Called Party Identification signal 235, decodes the Called Party ID 235, compares the Called Party ID 235 with Simultaneous Ring Called Party Identification data (also referred to as a "Simultaneous Ring Called Party Identification profile") stored in one or more databases of the communications network 120 and accesses communications instructions to communicate the Called Party ID, CallerID 335 to another communications address of the simultaneous ring service that does not answer the incoming communication 330.

Figure 4:
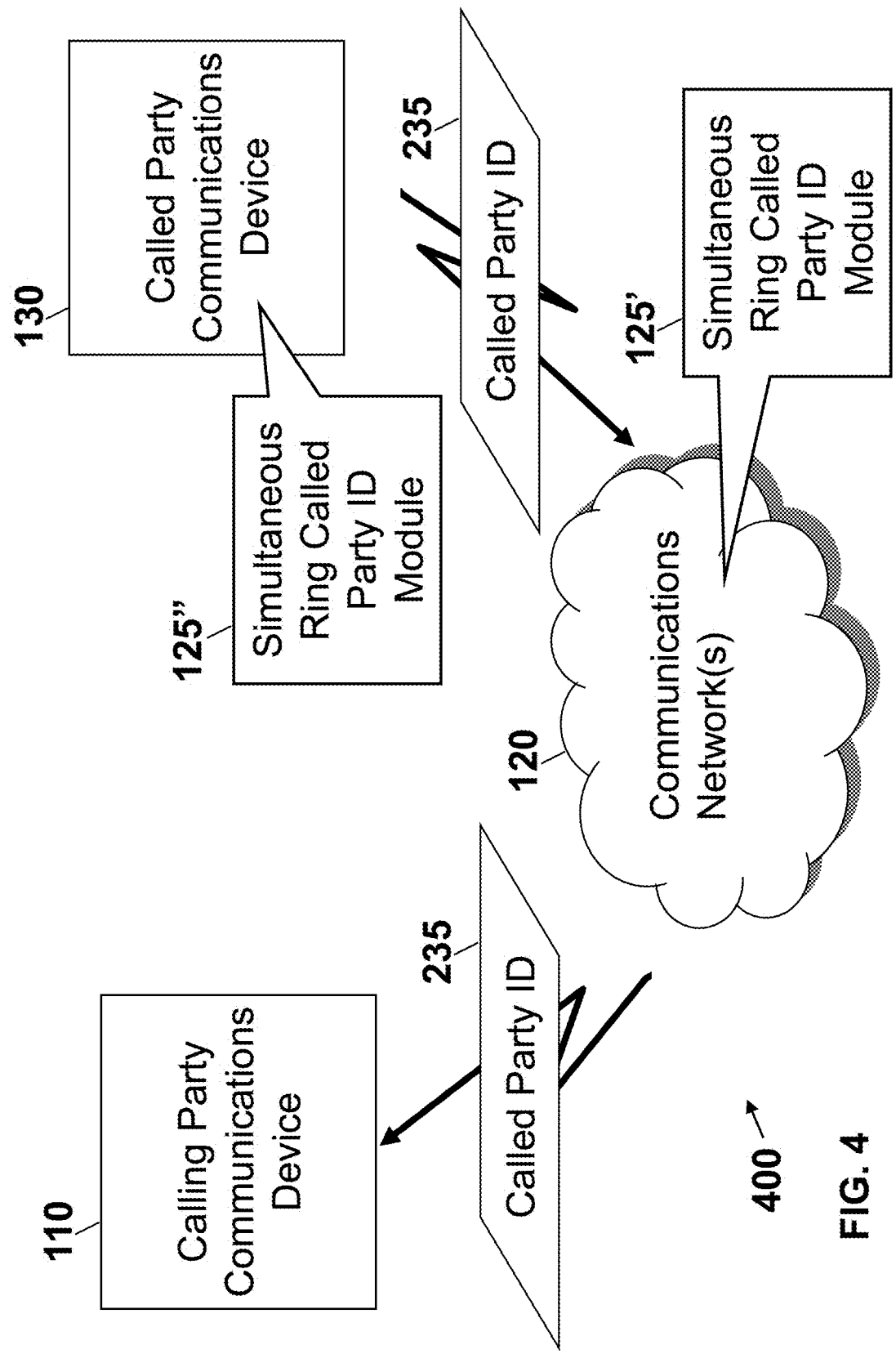
FIG. 4 is yet another simplified schematic of a Simultaneous Ring Called Party Identification communications system according to some of the exemplary embodiments.

FIG. 4 illustrates a Simultaneous Ring Called Party Identification communications system 400 similar to the Simultaneous Ring Called Party Identification communications system 200 of FIG. 2; however, the Simultaneous Ring Called Party Identification communications system 400 includes the Called Party Communications Device(s) 130 having the Simultaneous Ring Called Party Identification Module 125". That is, the answering called party's communications device includes the Simultaneous Ring Called Party Identification Module 125" which accesses locally stored Simultaneous Ring Called Party data, generates the Called Party ID signal 235, and communicates the Called Party ID signal 235 to the Simultaneous Ring Called Party Identification Module 125' residing on the server component of the communications network 120. Thereafter, the communications network 120 communicates the Simultaneous Called Party Identification Signal 235 to the calling party's communications device 110.

Figure 5:
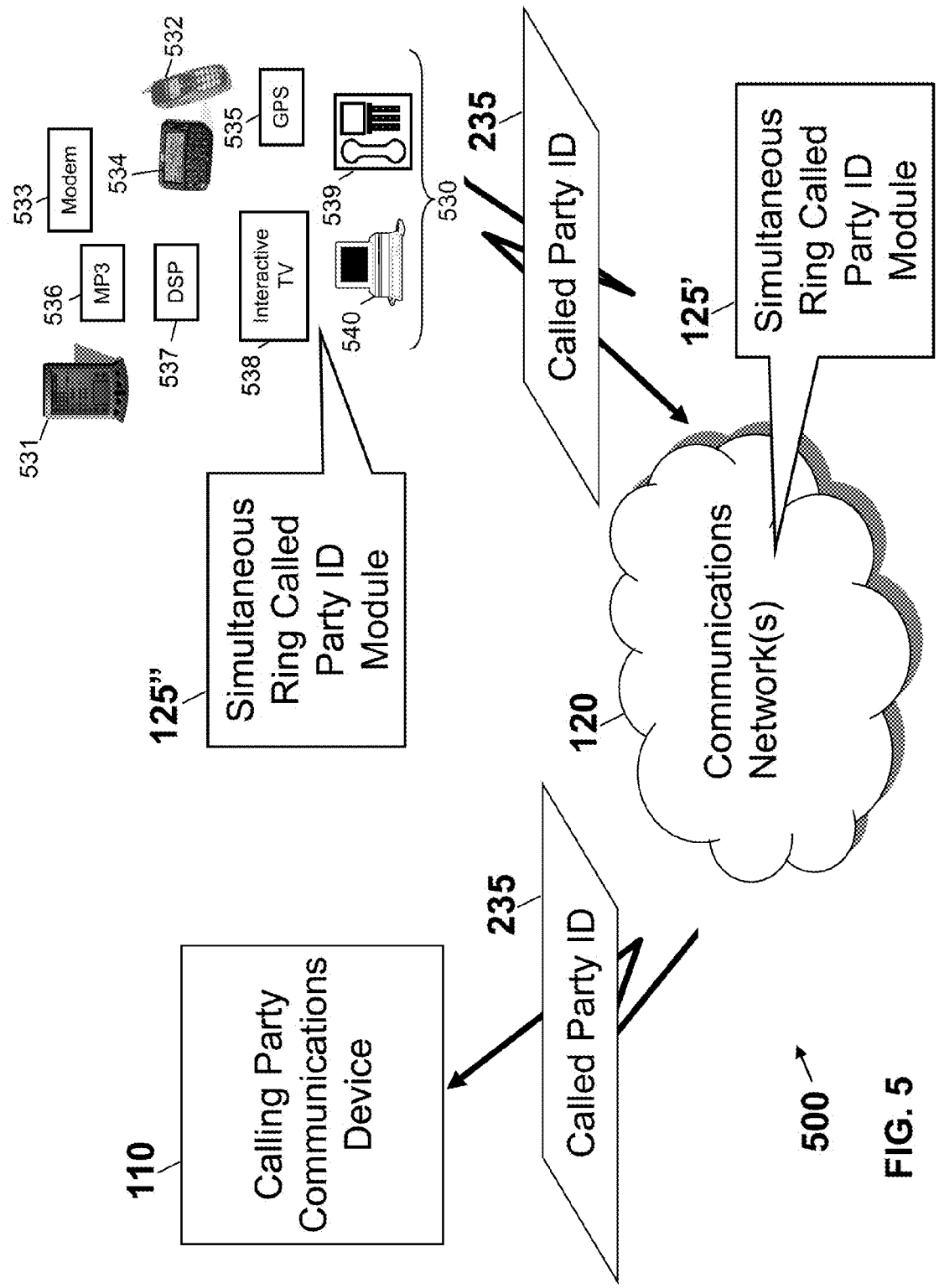
FIG. 5 illustrates the Simultaneous Ring Called Party Identification communications system of FIG. 4 showing more detailed called party's communications devices according to some of the exemplary embodiments.

FIG. 5 illustrates a Simultaneous Ring Called Party Identification communications system 500 similar the Simultaneous Ring Called Party Identification communications system 400 of FIG. 4; however, the Simultaneous Ring Called Party Identification communications system 500 illustrates various types of communications devices 530 that may be used by the called party to answer the incoming communication to the simultaneous ring service lines. The Simultaneous Ring Called Party Identification Module 125" and/or the server-component Simultaneous Ring Called Party Identification Module 125' operates within any of these various types of communications devices 53 that include a personal digital assistant (PDA) 531, a Voice over Internet Protocol (VOIP) phone 532, a modem 533, an interactive pager 534, a Global Positioning System (GPS) device 535, a digital musical recorder device 536, any computer system utilizing a digital signal processor 537, an interactive television 538, a Plain Old Telephone System (POTS) phone 539, and/or a computer 540. The communications device 530 may also include watches, radios, vehicle electronics, clocks, printers, gateways, and other apparatuses and systems. As those of ordinary skill in the art understand, the communications device 530 and the Simultaneous Ring Called Party Identification Module 125" (or, alternatively, the communications device 530 and the Simultaneous Ring Called Party Identification Module 125' of the communications network 120) has the intelligence for appropriate formatting of the Called Party ID 235 (and, similarly the Called Party ID, CallerID 335 shown in FIG. 3) to the communications device of the calling party 110 (or to another communications device of the called party that does not answer the incoming communication shown as reference numeral 330 of FIG. 3). For example, if the communications device 530 uses the Wireless Application Protocol (WAP) technique, then the Called Party ID 235 is formatted using the Wireless Mark-up Language (WML) and configured according to standards known in the art. The Wireless Mark-up Language (WML) and the WAP technique are known and will not be further described. This is a description of a solution for a specific wireless protocol, such as WAP. This solution may be clearly extended to other wireless protocol, such as i-mode, VoiceXML (Voice eXtensible Markup Language), Dual Tone Multi-Frequency (DTMF), and other signaling means.

Figure 6:
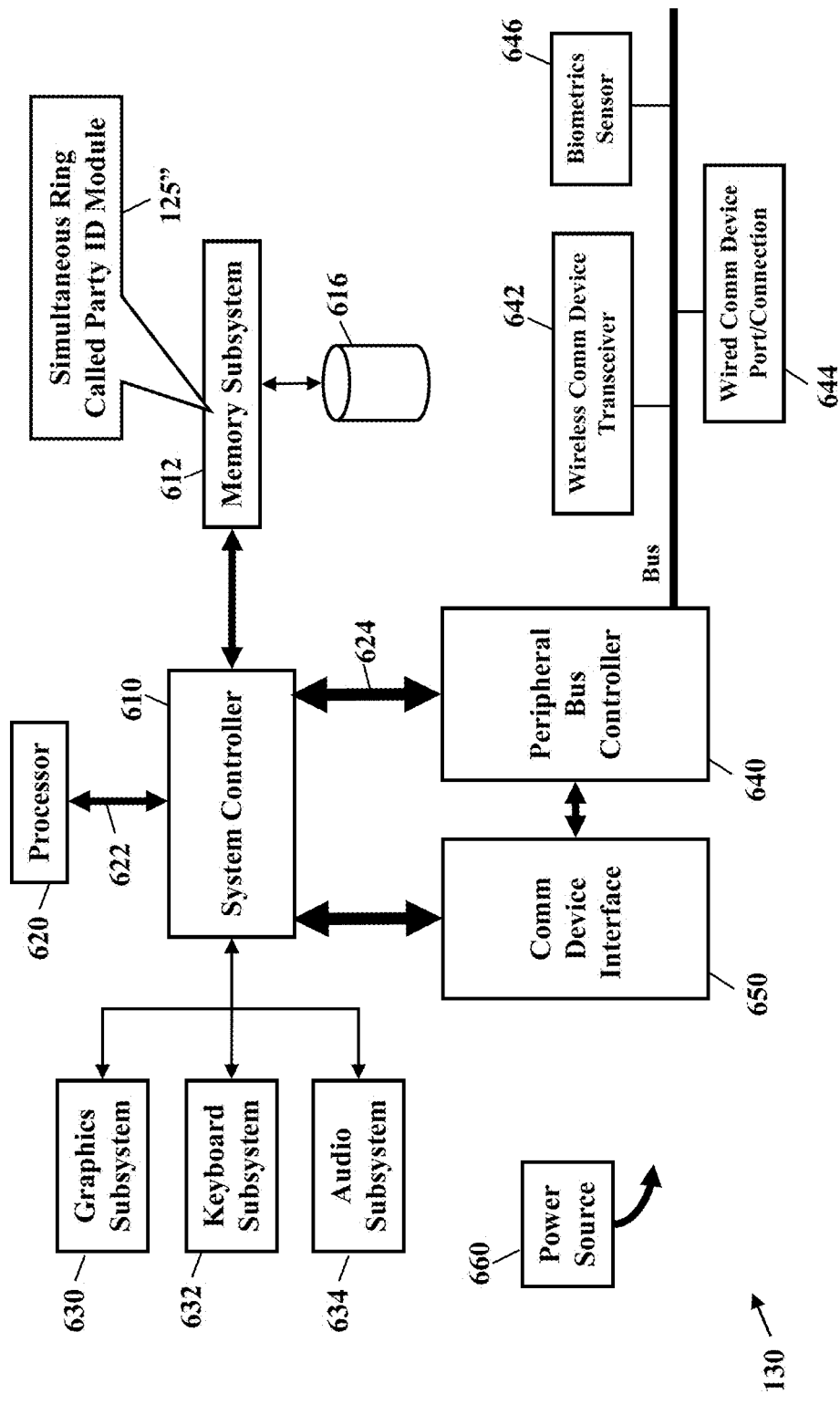
FIG. 6 is a block diagram of a communications device having a Simultaneous Ring Called Party Identification Module according to some of the exemplary embodiments.

FIG. 6 is a block diagram of exemplary details of the communications device 130 shown in FIG. 1. The communications device 130 includes the Simultaneous Ring Called Party Identification Module 125" that operates within a system memory device 612. The Simultaneous Ring Called Party Identification Module 125", however, could also reside in flash memory or a peripheral storage device 616. The communications device 130 also has one or more central processors 620 executing an operating system. The operating system, as is well known, has a set of instructions that control the internal functions of the communications device 130. A system bus 622 communicates signals, such as data signals, control signals, and address signals, between the central processor(s) 620 and a system controller 610. The system controller 610 provides a bridging function between the memory subsystem 612, the one or more central processors 620, a graphics subsystem 630, a keyboard subsystem 632, an audio subsystem 634, a PCI (Peripheral Controller Interface) bus 624, and a Communications ("Comm") Device Interface 650. The PCI bus 624 is controlled by a Peripheral Bus Controller 640. The Peripheral Bus Controller 640 is an integrated circuit that serves as an input/output hub for various peripheral ports and/or transceivers. These peripheral ports allow the communications device 130 to communicate with a variety of communications devices through networking ports (such as SCSI or Ethernet) that include Wireless Communications ("Comm") Device Transceiver 642 (such as Wireless 802.11 and Infrared) and Wired Communications ("Comm") Device Port/Connection 644 (such as modem V90+ and compact flash slots). These peripheral ports could also include other networking ports, such as, a serial port (not shown) and/or a parallel port (not shown). The Comm Device Interface 650 allows the communications device 130 to monitor, detect, receive, and decode incoming communications signals to the communications device(s) connected to the Wireless Comm Device Transceiver 642 and/or the Wired Comm Device Port/Connection 646. Further, the Comm Device Interface 650 transmits the outgoing Simultaneous Ring Called Party Identification signal 235 (also referred to as the "Called Party ID" 235 in FIGS. 2-5) to the Wireless Comm Device Transceiver 642 and/or the Wired Comm Device Port/Connection 646. Still further, the communications device 130 may include a power source 660, such as a rechargeable battery to provide power and allow the communications device 130 to be portable. In alternate embodiments, the communications device 130 could include its own telephone line (or other communications connection) to the communications network 120 (not shown). Another alternative may include the communications device 130 incorporated into a specially designed communications device (not shown). Those of ordinary skill in the art understand that the program, processes, methods, and systems described herein are not limited to any particular architecture or hardware.

The processors 620 may be implemented with a digital signal processor (DSP) and/or a microprocessor. Advanced Micro Devices, Inc., for example, manufactures a full line of microprocessors (Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com).

Texas Instruments offers a wide variety of digital signal processors (Texas Instruments, Incorporated, P.O. Box 660199, Dallas, Tex. 75266-0199, Phone: 972-995-2011, www.ti.com) as well as Motorola (Motorola, Incorporated, 1303 E. Algonquin Road, Schaumburg, Ill. 60196, Phone 847-576-5000, www.motorola.com). There are, in fact, many manufacturers and designers of digital signal processors, microprocessors, controllers, and other components that are described in this patent. Those of ordinary skill in the art understand that this components may be implemented using any suitable design, architecture, and manufacture. Those of ordinary skill in the art, then understand that the exemplary embodiments are not limited to any particular manufacturer's component, or architecture, or manufacture.

The system memory device (shown as memory subsystem 612 or peripheral storage device 616) may also contain one or more application programs. For example, an application program may cooperate with the operating system and with a video display unit (via graphics subsystem 630) to provide a GUI for the Simultaneous Ring Called Party Identification Module 125". The GUI typically includes a combination of signals communicating with the graphics subsystem 630 and/or the keyboard subsystem 632. The GUI provides a convenient visual and/or audible interface with the user of the communications device 130. As is apparent to those of ordinary skill in the art, the user (e.g., calling party) interacts with the Simultaneous Ring Called Party Identification Program over a variety of mediums, such as, for example, a stylus, keyboard, and punch buttons of the keyboard subsystem 632, a display screen of the graphics subsystem 630, and/or a voice-activated menu prompt of the audio subsystem 634. Additionally, the peripheral bus controller 640 provides an interface with a biometrics sensor 646, such as, for example, a fingerprint ID device. The biometrics sensor 646 may distinguish between different users that share or otherwise use the communications device 130. Further, the biometrics sensor 646 may provide security features that prevent unauthorized users from exploiting the communications device 130. The biometrics sensor 646 could also comprise retina recognition device and software, DNA/RNA recognition device and software, facial recognition device and software, speech recognition device and software, and/or scent recognition device and software.

Figure 7:
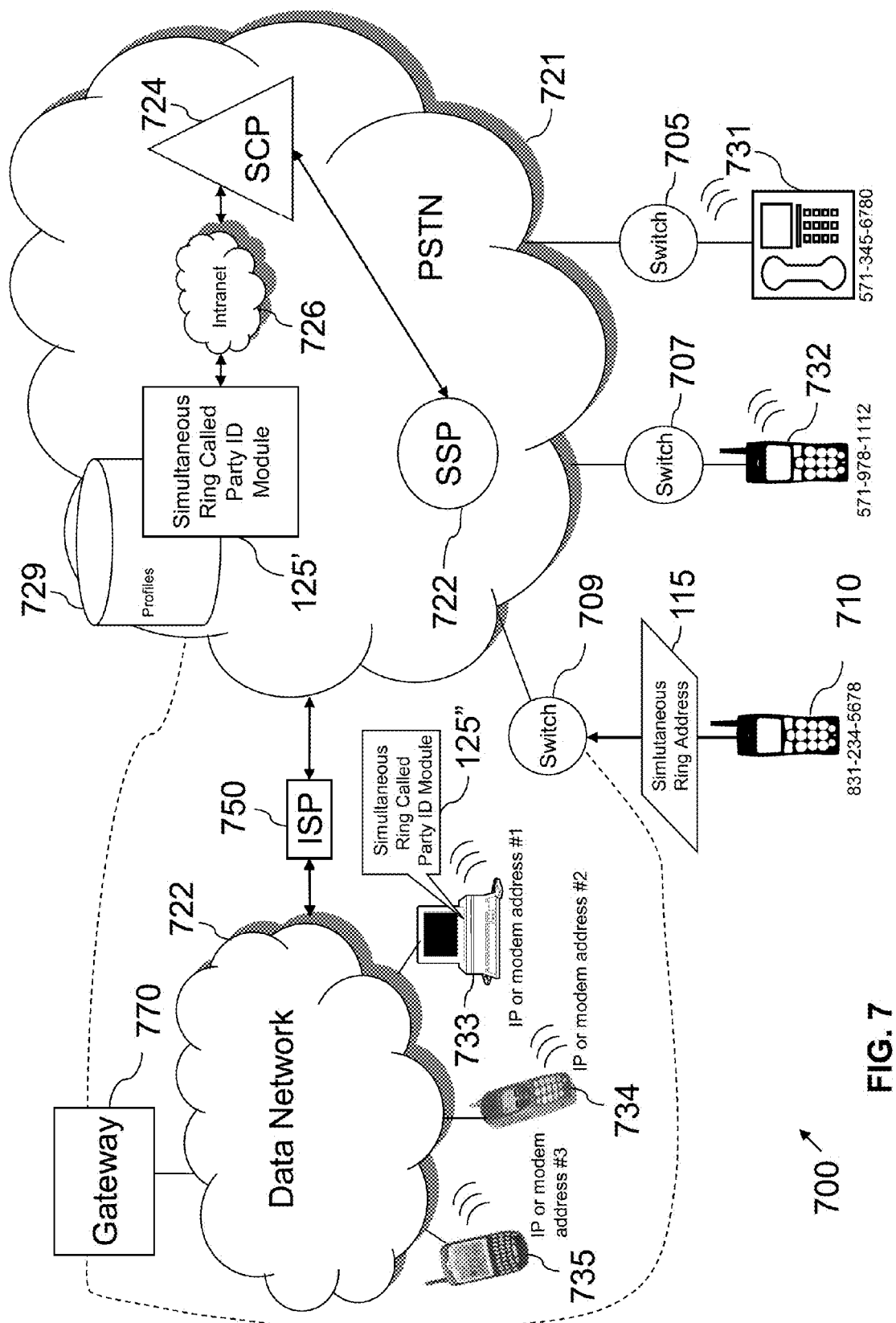
FIG. 7 is a schematic of a more detailed Simultaneous Ring Called Party Identification communications system that illustrates communications connections among a calling party's communications address and associated communication device, the communications network(s), and the called party's communications addresses and respective communications devices according to some of the exemplary embodiments.
Figure 8:
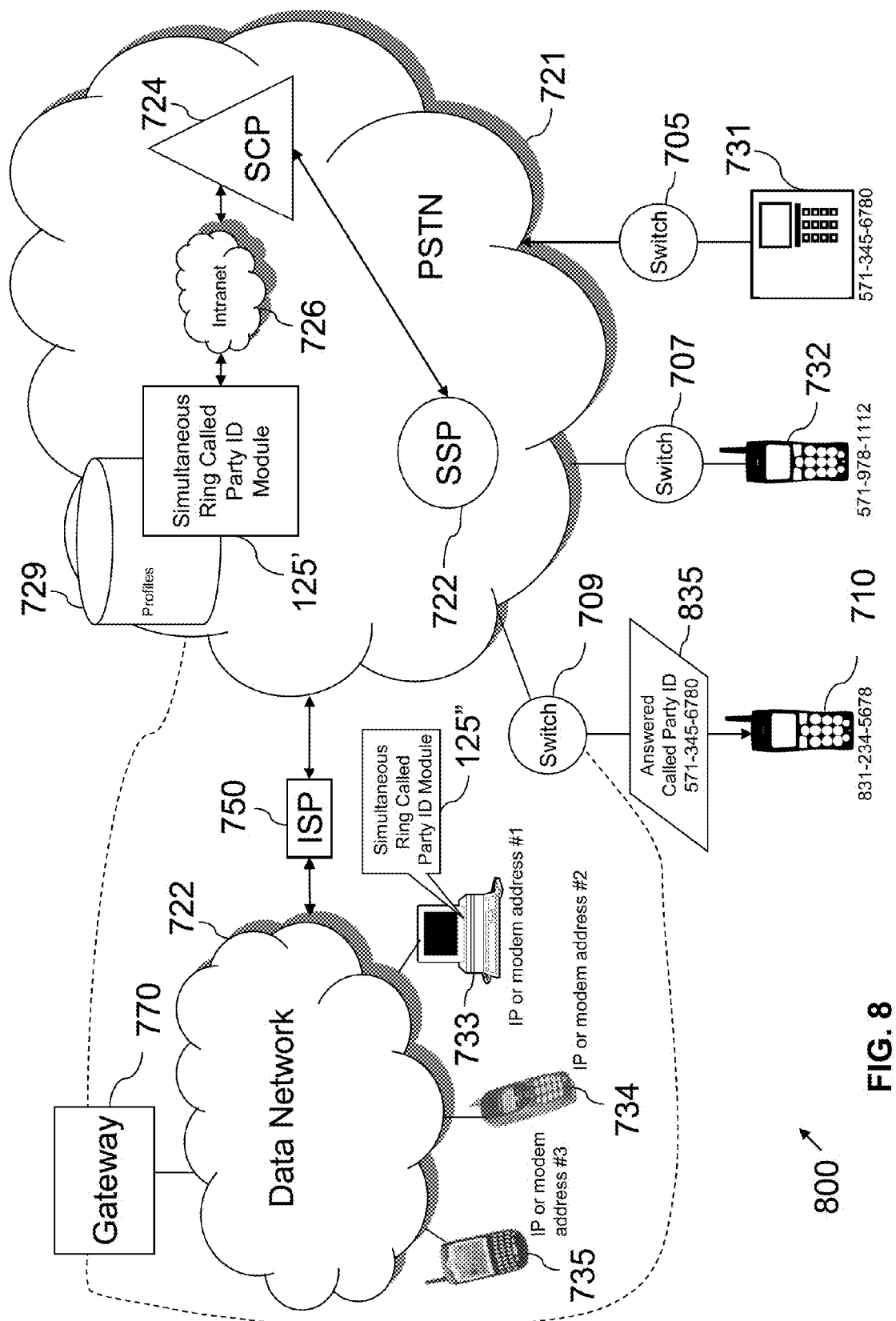
FIG. 8 is a schematic of a more detailed Simultaneous Ring Called Party Identification communications system that illustrates communications connections among a calling party's communications address and associated communication device, the communications network(s), and the called party's communications addresses and respective communications devices according to some of the exemplary embodiments.
Figure 12:
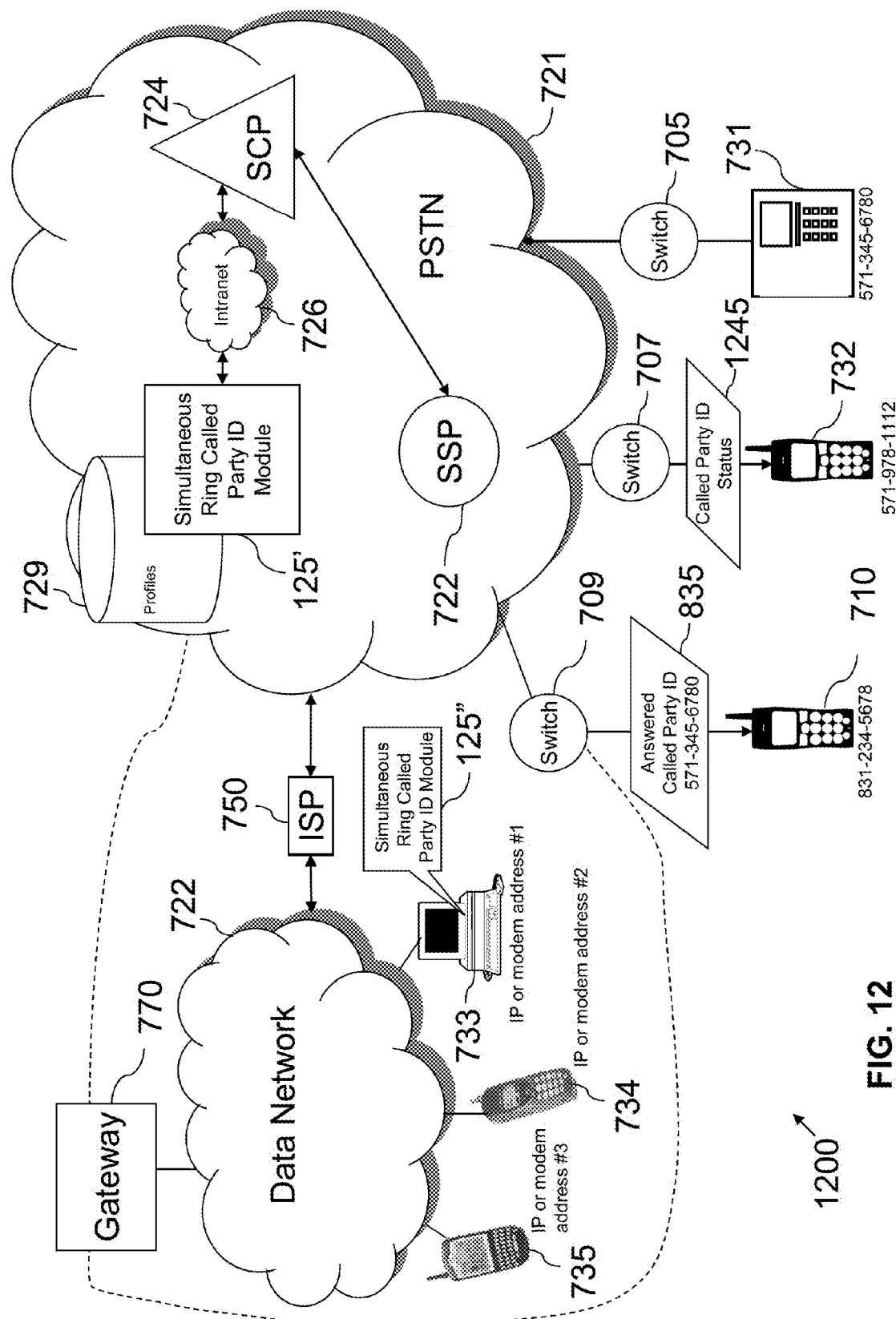
FIG. 12 is a schematic of a more detailed Simultaneous Ring Called Party Identification communications system that illustrates communications connections among a calling party's communications address and associated communication device, the communications network(s), and the called party's communications addresses and respective communications devices according to some of the exemplary embodiments.

Referring now to FIGS. 7, 8, and 12, the description of simultaneous ring services, methods, and the systems are generally directed to a simultaneous ringing service (or alternate service to alert at least two different communications addresses of an incoming communication) for a finite number of telecommunications lines and for a finite number of data communications lines. Further, while the description of the alert is directed to a ringing or alternate audio alert, the alert may include a visual or other sensory indicator of the incoming communication. One of ordinary skill in the art will recognize how such services, methods, and systems are adapted to ring or alert more lines simultaneously and to provide the called party's identification to the calling party.

FIG. 7 is a schematic of a Simultaneous Ring Called Party Identification communications system 700 illustrating communications connections among the communications network(s) (shown as reference numerals 721 and 722), the calling party's communications device 710 having a communications address of 831-234-5678, and a plurality of called party's communications devices at various communications addresses—shown as POTS phone 731 having a communications address of 571-345-6780, cellular phone 732 having a communications address of 571-978-1112, computer system 833 having a first IP or modem communications address, a VoIP phone 834 having a second IP or modem communications address, and a PDA 835 having a third IP or modem communications address. The POTS phone 731 is coupled with a communications switch 705 connected to a telecommunications network 721. The cellular phone 732 transmits and receives signals with a Mobile Switching Office (MSO) (not shown) that communicates with switch 707 to connect to the telecommunications network 721. The telecommunications network 721 includes a service switching point (SSP) 722, a service control point (SCP) 724, an Intranet 726 (for the telecommunications provider to administer and program the telecommunications network 721 components), a Simultaneous Ring Called Party Identification Dataserver having the Simultaneous Ring Called Party Identification Module 125', and a database of one or more Simultaneous Ring Called Party Identification profiles 729. The system 700 further includes an Internet Service Provider (e.g., America On-Line) 750, a data network 722 communicating with communications devices 733, 734, and 735, a gateway 770, and a third communications switch 709 connected to the calling party's communications device—shown as a cellular phone 710 (that is capable of communications with the telecommunications network 721 and with the data network 722). Each switch 705, 707, and 709 allows the connected communications device to transceive electronic communication signals via the data network 722 (e.g., world wide electronic data network such as an Internet, an Intranet, and/or an Extranet) and/or the telecommunications network 721 (e.g., a central office (CO), MSO, and/or a combination CO/MSO). The telecommunications network 721 may use any means of coupling one of the switches 705, 707, and 709 to the telecommunications network 721, but the coupling means is preferably high-capacity, high-bandwidth optical transport services, Gigabit Ethernet services, and/or the like. As those of ordinary skill in the art of telecommunications understand, the telecommunications network 721 could also link each of the switches 705, 707, and 709 via other appropriate means, such as, for example a Synchronous Optical Network (SONET) structure with redundant, multiple rings.

According to an exemplary embodiment, a calling party uses his/her communications device 710 to enter or otherwise input the simultaneous ring communications address 115 (referred to as "Simultaneous Ring Address" in FIG. 7) to initiate an incoming communication to a called party of a simultaneous ring service. The called party of the simultaneous ring service is alerted of the incoming communication at each of the associated called party's communications devices 731, 732, 733, 734, and 735 to gain access to the telecommunications network 721 and/or to the data network 722. For example, the communications signal from the calling party's communications device 710 is routed through the telecommunications network 721 via switch 705. Alternatively, the communications signal from the calling party's communications device 710 may be routed through switch 709 to the gateway 770 for further communication and/or processing with the data network 722 and/or the telecommunications network 721. The communications signal along with the Simultaneous Ring Address 115 is detected at SSP 722 and decoded by the SCP 724 and by the Simultaneous Ring Called Party Identification Module 125' of the communications network 721 to associate each communications address of the simultaneous ring service lines to called party's communications device 731, 732, 733, 734, and/or 735. That is, if the Simultaneous Ring Address 115 is identified as a communications address for a simultaneous alert service to a plurality of communications addresses by the SSP 722, then the SCP 724 and the Simultaneous Ring Called Party Identification DataServer having the Simultaneous Ring Called Party Identification Module 125' further process and route the incoming communications to each of the simultaneous ring service lines. According to some of the exemplary embodiments, when one of the called party's communications devices 731, 732, 733, 734, and 735 answers the incoming communication, then the Simultaneous Ring Called Party Identification Module 125' accesses or otherwise queries the answering communications device for a called party identifier (e.g., the Simultaneous Ring Called Party Identifier) and matches the called party identifier with the database 729 of Simultaneous Ring Called Party Identification profiles to retrieve or otherwise generate a Simultaneous Called Party Identification signal (shown as "Answered Called Party ID '571-345-6780' in FIG. 8) 835 to communicate to the calling party's communications device 710.

As FIG. 8 illustrates, if the POTS phone 711 answers the incoming communication, then the Simultaneous Ring Called Party Identifier is obtained by the Simultaneous Ring Called Party Identification Module 125' of the telecommunications network 721. The Simultaneous Ring Called Party Identification Module 125' accesses the database 729 to retrieve or otherwise generate the Simultaneous Ring Called Party Identification signal 835. The profile may include data associated with each answering communications address (e.g., POTS phone 711), data associated with each communications address of the simultaneous ring service that does not answer the incoming communication (e.g., cellular phone 712, computer 733, VoIP phone 734, and PDA 735), data associated with the calling party communications address 710 (e.g., an instruction to block Simultaneous Ring Called Party Identification communications, to access presentation capabilities of the calling party's communications device 710), and/or to obtain other preferences, instructions, files, and/or associated the Simultaneous Ring Called Party Identification profile as further described below. Thereafter, the telecommunications network 721 may communicate the Simultaneous Called Party Identification signal 835 via switch 709 to the calling party's communications device 710. Alternatively, the telecommunications network 721 may transmit the Simultaneous Called Party Identification signal 835 via ISP 750 (or other data connection) to the data network 722. The data network 722 then sends the Simultaneous Called Party Identification signal 835 via the gateway 770 to the calling party's communications device 710 via switch 709. Still, another alternative, is for the telecommunications network 721 to transmit the Simultaneous Called Party Identification signal 835 directly to the gateway 770 (such as when the Simultaneous Ring Called Party Identification profile provides a static IP address of the calling party's communications device 710) to communicate to the calling party's communications device 710 via switch 709. In addition to transmitting the Simultaneous Called Party Identification signal 835, the telecommunications network 721 may also connect the calling party's communications device 710 with the answering called party's communications device 731 to establish a voice connection (e.g., connect the telephone call).

For example, assume that the Simultaneous Ring Called Party Identification Module 125' accesses or otherwise identifies the communications address of the called party (e.g., communications addresses 731, 732, 733, 734, or 735). These communications addresses that subscribe to the simultaneous ring service may include a communications address of a residence, a mobile and/or cellular device either owned or otherwise controlled by the subscriber, an electronic data address (e.g., IP address), a communications address of a business (e.g., a work number), a communications address of a public and/or municipal establishment (e.g., a phone located in an airport terminal), and other communications addresses frequently used by the subscriber. The subscriber may provide these communications addresses to the Simultaneous Ring Called Party Identification Module 125' (or other software product) of the server-component of the communications network 721, 722 according to some of exemplary embodiments and obtain a universal, shared simultaneous ring communications address (shown as reference numeral 115 in FIGS. 1 and 7). The Simultaneous Ring Called Party Identification Module 125' then associates the simultaneous ring communications address 115 with the communications addresses of the subscriber's communications addresses 731, 732, 733, 734, and 735 in a look up table. The look up table may be stored in the database 729. The look up table may be, for example, as shown in Table 1 below.

TABLE 1

An Example of a Simultaneous Ring Called Party Identification Look Up Table

| Simultaneous Ring Address or Identifier | Subscriber Identifier | Associated Communications Addresses |
|---|---|---|
| 571-345-6700 | Subscriber 100100 571-345-6780, John Johnson | 571-345-6780 home phone 571-978-1112 cellular phone 804-231-4567 work phone 192.9.205.21 home computer IP address 192.9.212.35 PDA IP address for work 504-321-9876 VOIP temporary phone number 192.9.212.22 VOIP IP address |
| Susan Johnson | Subscriber 100101 571-345-6780, Susan Johnson (dependent) | 571-345-6780 home phone 571-978-1112 cellular phone 192.9.205.21 home computer IP address |

TABLE 1 An Example of a Simultaneous Ring Called Party Identification Look Up Table Simultaneous Ring Address Associated Communications or Identifier Subscriber Identifier Addresses 571-345-6700 Subscriber 100100 571-345-6780 571-345-6780, John home phone Johnson 571-978-1112 cellular phone 804-231-4567 work phone 192.9.205.21 home computer IP address 192.9.212.35 PDA IP address for work 504-321-9876 VOIP temporary phone number 192.9.212.22 VOIP IP address Susan Johnson Subscriber 100101 571-345-6780 571-345-6780, Susan home phone Johnson (dependent) 571-978-1112 cellular phone 192.9.205.21 home computer IP address Table 1 further illustrates that multiple users (John and Susan) can share the same communications address (e.g., IP address 192.9.205.21 of computer 733) but have different Simultaneous Ring Called Party Identification signals. For example, if the called party's communications device includes a biometrics sensor or other means to identify the user (e.g., login information, electronic mailing address, and so on), then each user may have a unique universal, caller identification that is provided for his/her outgoing communications.

Further, the personal computer 733, the VOIP phone 734, and the PDA 735 are each respectively coupled or otherwise communicate with the data network 722 via an Internet Protocol (IP) based communications address or modem connection. Each of these devices 733, 734, and 735 include the Simultaneous Ring Called Party Identification Module 125" and memory to store one or more profiles to access upon answering an incoming communication from the calling party's communications device 710. Consequently, if one of these devices 733, 734, and 735 answers the incoming communication, for example, if computer 733 answers the incoming communication, then the Simultaneous Ring Called Party Identification Module 125" generates the Simultaneous Called Party Identification signal 235 and communicate the Simultaneous Called Party Identification signal 835 to the data network 722 for processing and further communication to the calling party's communications device 710. Further, the subscriber and/or a user may interact with the Simultaneous Ring Called Party Identification Module 125' and with Intranet 726 to access and login to the Simultaneous Ring Called Party Identification DataServer having the Simultaneous Ring Called Party Identification Module 125' to establish, modify, or otherwise manage a Simultaneous Ring Called Party Identification profile in the database 729. Alternatively, an administrator of the telecommunications network 721 could similarly use another personal computer (not shown) and/or alternate workstation (not shown) networked with the Intranet 726 to access, add, delete, store, modify, and manage the database 729 of one or more Simultaneous Ring Called Party Identification profiles. The Simultaneous Ring Called Party Identification profiles control access, sharing, notification, routing, security, transactions, troubleshooting, management, and/or additional processing of Simultaneous Ring Called Party Identification signals (i.e., the Simultaneous Called Party Identification signal 835) exchanged to/from telecommunications network and/or data network customers, users, and non-customers. More specifically, the Simultaneous Ring Called Party Identification profiles establish preferences for processing the Simultaneous Ring Called Party Identification signal including (1) archiving the Simultaneous Ring Called Party Identification signal to a storage device associated with the telecommunications service provider, (2) Encrypting the Simultaneous Ring Called Party Identification signal (or a portion of the Simultaneous Ring Called Party Identification signal) so that only the calling party's communications device can decipher the Called Party ID, (3) copying the Simultaneous Ring Called Party Identification signal, and (4) associating the Simultaneous Ring Called Party Identification signal with a variety of fields, files, and/or other data for Simultaneous Ring Called Party Identification services, such as, for example login information associated with the customer, user, and/or administrator, password, telephone number(s) or Service Node(s) of the customer (this may include a plurality of addresses that are associated with a Service Node or other switch serving the called party's communications devices, TCP/IP addresses serving the called party's communications devices, email address(es) of the subscriber, profile of the called party's communications devices, profile of the calling party's communications device (e.g., presentation formats of various communications devices), a time or date identifier for activating or deactivating the Simultaneous Ring Called Party Identification service (e.g., day of week or calendar date), size and content of Simultaneous Ring Called Party Identification signal, reply(s), delivery failure notification(s), display and/or presentation data associated with Called Party ID (or, alternatively, with the Called Party, CallerID) (e g, name, color, font, doodle, etc.), and telecommunications network defaults. Typically, the Simultaneous Ring Called Party Identification profile includes data for (1) the communications address of each registered communications device for the Simultaneous Ring Called Party Identification service, (2) an identifier of the registered communications address that answers the incoming communication, (3) the Simultaneous Called Party Identification signal (4) an identifier of the calling party's communications address (e.g., a phone number of the calling party's telephone), (5) communications instructions to other registered communications devices, (6) an identifier of a calling party's communications device (e.g., a cellular phone), and (7) default service parameters. The data of the Simultaneous Ring Called Party Identification profile provide instructions for (1) billing for communication of Simultaneous Ring Called Party Identification signals over the communications network, (2) parameters that enable the Simultaneous Ring Called Party Identification signal including times of day and days of week, (3) parameters that disable the Simultaneous Ring Called Party Identification signal including times of day and days of week, (4) parameters to block the Simultaneous Ring Called Party Identification signal, (5) identification and authentication parameters, (6) parameters to bypass the disable parameters, (7) memory services for data stored with the Simultaneous Ring Called Party Identification signal, and/or (8) configuration and formatting preferences for each communications device communicating with one of the communications networks. In addition, the data for the Simultaneous Ring Called Party Identification services may include instructions for troubleshooting problems including error messages. Thus, Simultaneous Ring Called Party Identification DataServer having the Simultaneous Ring Called Party Identification Module 125' functions as a computer server, database, and processor that is dedicated to managing Simultaneous Ring Called Party Identification Services including communications of Simultaneous Ring Called Party Identification signals over the telecommunications network 721 to other connected networks (e.g., data network 722) and/or connected communications devices (e.g., calling party's communications device 710 and called party's communications devices 731-735).

The telecommunications network 721 may include wired, optical, and/or wireless elements and may further include private network elements, such as private branch exchanges (PBXs), and/or other elements (not shown). The telecommunications network 721 includes Advanced Intelligent Network (AIN) componentry controlling many features of the network. The telecommunications network 721 and/or each of the switches 705, 707, and 709 could also include a packet-based "soft switch" that uses software control to provide voice, video, and/or data services by dynamically changing its connection data rates and protocols types. If the telecommunications network 721 and/or one of the switches 705, 707, and 709 should include a softswitch, the AIN componentry is replaced by an application server that interfaces with the softswitch via a packet protocol, such as Session Initiation Protocol (SIP). The means of communicating the Simultaneous Ring Called Party Identification signal between or among the answering called party's communications device 731, the switch 705, the telecommunications network 721 including AIN componentry and the Simultaneous Ring Called Party Identification module 125', the data network 722 including the gateway 770, and the calling party's communications device 710 include a variety of means, including optical transmission of data (e.g., any medium capable of optically transmitting the data), wireless transmission of data (e.g., wireless communications of the data using any portion of the electromagnetic spectrum), and/or fixed-wire transmission of data (e.g., any medium capable of transmitting electrons along a conductor). Fiber optic technologies, spectrum multiplexing (such as Dense Wave Division Multiplexing), Ethernet and Gigabit Ethernet services, Infrared, the family of IEEE 802 standards, and Digital Subscriber Lines (DSL) are just some examples of the transmission means. The signaling between the called party's communications device 731, 732, 733, 734, and/or 735, the switches 705, 707, and 709, the telecommunications network 721 including AIN componentry, the data network 722 including the gateway 770, and the calling party's communications device 710, however, are well understood in by those of ordinary skill the art and will not be further described. Further, those of ordinary skill in the art will be able to apply the principles of this invention to their own network configurations which may differ substantially from the communications system(s) shown in the figures.

Figure 9:
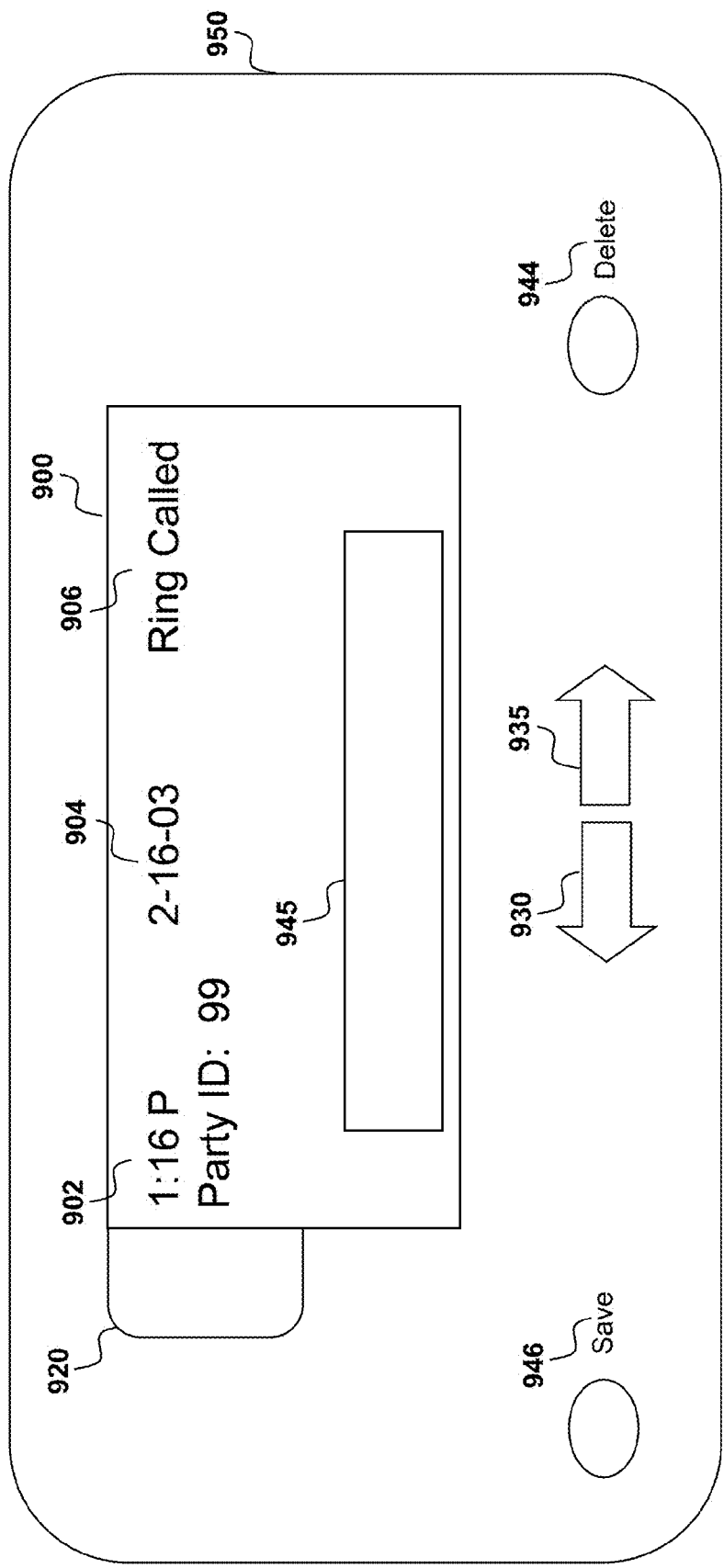
FIG. 9 is a perspective view of a caller identification display of the calling party's communications device according to the prior art.

FIG. 9 illustrates a schematic of a conventional CallerID device 900 that may be coupled with the calling party's communications device such as reference numeral 710 shown in FIG. 7. The CallerID device 900 includes a display screen 900 having a time identifier 902, a date identifier 904, a numeric identifier 906 of an incoming CallerID signal, a lighted panel 920 that alerts the calling party of a new, incoming, and/or stored ICLID signal, a "Save" punch button 946, a "Delete" punch button, a left arrow button 930, a right arrow button 935, and a housing 950 that protects the internal componentry of the CallerID device 900. Typically, the CallerID device 900 receives an incoming ICLID signal and displays an originating NANP number (i.e., the telephone number of a calling party for an incoming call) and/or a name associated with the originating NANP number to display 945. Conventional CallerID devices comply with standards known in the art that limit the display of the ICLID signal to two lines of text, each line containing approximately fifteen (15) characters. As shown in FIG. 9, when the CallerID device 900 is coupled with the calling party's communications device that initiates an outgoing call, the display 945 is blank and does not identify the simultaneous ring line service number.

Figure 10:
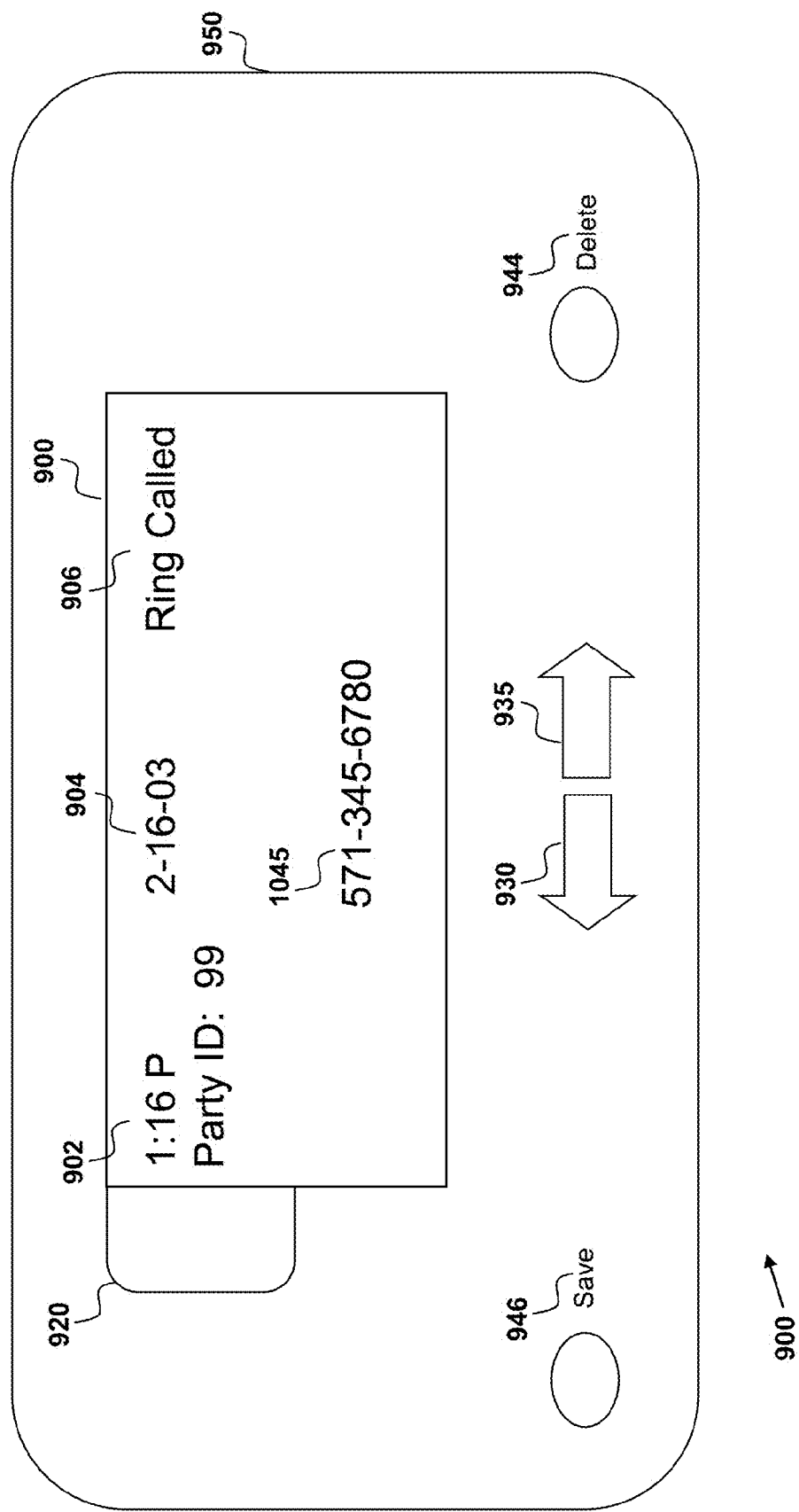
FIG. 10 is a perspective view of a caller identification display of the calling party's communications device illustrating the Simultaneous Ring Called Party Identification according to some of the exemplary embodiments.
Figure 11:
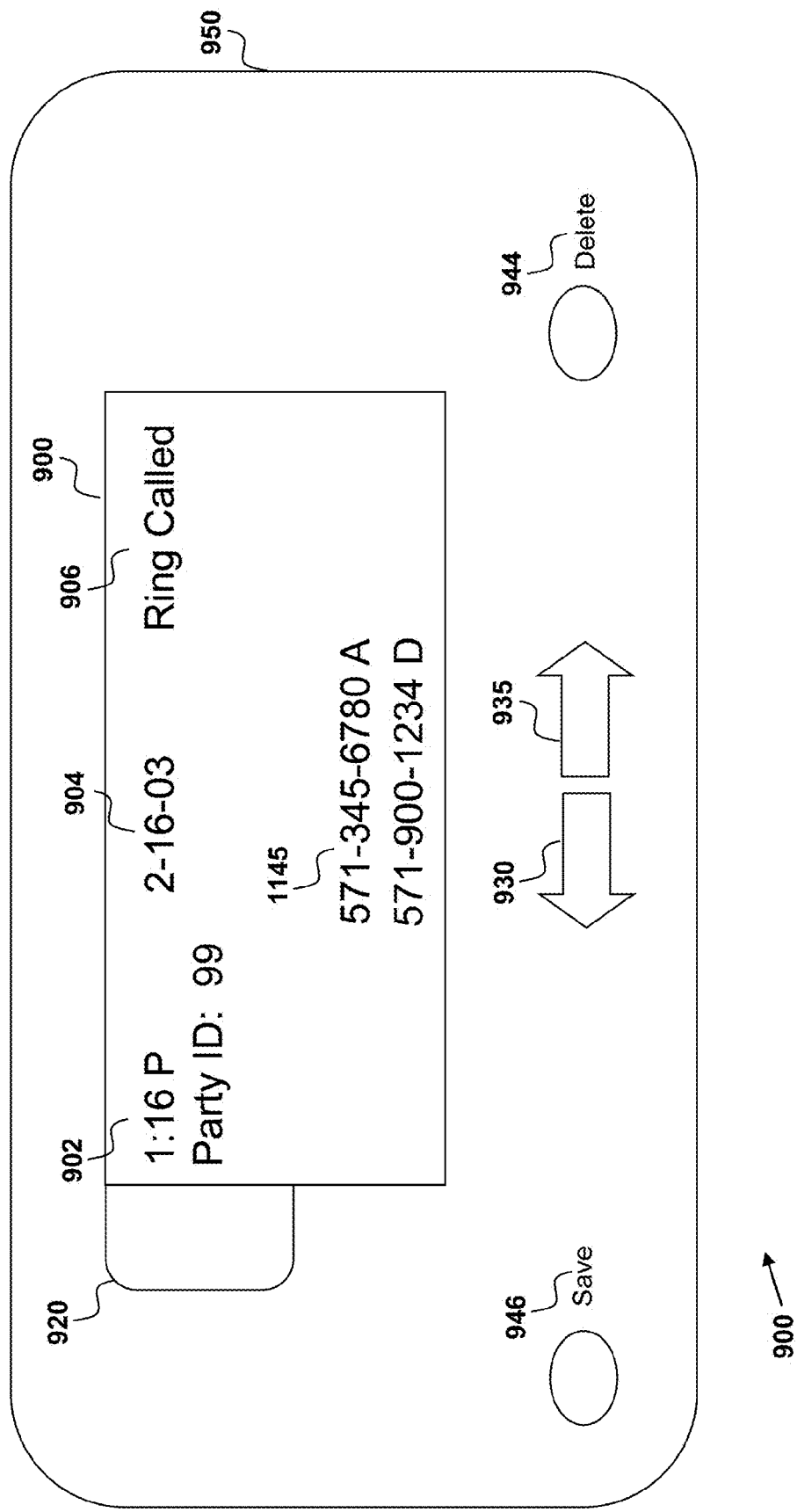
FIG. 11 is another perspective view of a caller identification display of the calling party's communications device illustrating the Simultaneous Ring Called Party Identification according to some of the exemplary embodiments.

FIG. 10 illustrates another schematic of a CallerID device 1000 similar to the CallerID device 900 of FIG. 9. However, a display 1045 includes a Simultaneous Ring Called Party Identifier shown as "571-345-6780" and indicates the telephone number of the answering simultaneous ring line (i.e., POTS phone 731 shown in FIG. 8) to the calling party. Consequently, the CallerID device 1000 informs the calling party of the actual communications address (or alternate called party identifier) that answers his/her outgoing communication, and the calling party is better prepared for the communication. Further, the CallerID device 1000 may store the Simultaneous Ring Called Party Identifier 1045 to access a direct communications address (or alternate communications address for future communications) of the answering called party. According to further exemplary embodiments shown in FIG. 11, a CallerID device 1100 may further display a Simultaneous Ring Called Party Identifier 1145 that includes the answering called party's communications address shown as "571-345-6780 A" ("A" denotes answered) and also includes the dialed simultaneous ring communications address shown as "571-900-1234 D" ("D" denotes dialed). Consequently, the CallerID device 1100 of FIG. 11 stores both the answered called party identifier and the simultaneous ring service line number.

Figure 13:
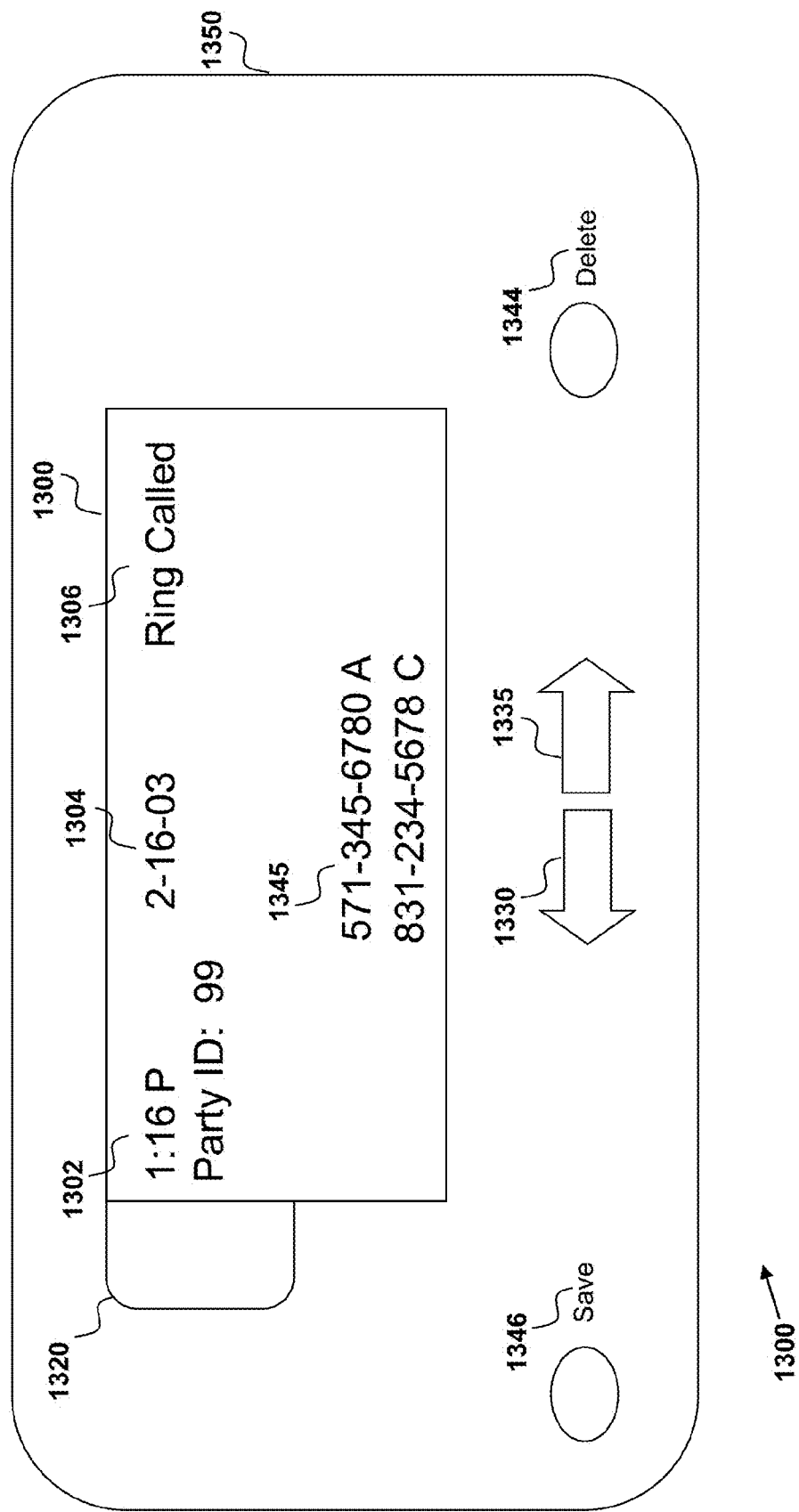
FIG. 13 is a perspective view of a caller identification display of an associated, non-answering calling party's communications device illustrating the Simultaneous Ring Called Party Identification according to some of the exemplary embodiments.

FIG. 12 is a schematic of a Simultaneous Ring Called Party Identification communications system 1200 similar to the Simultaneous Ring Called Party Identification communications system 800 disclosed in FIG. 8. However, the Simultaneous Ring Called Party Identification communications system 1200 further illustrates a Called Party ID Status 1245 communicated to a non-answering communications address of the simultaneous ring service shown as cellular phone 732. According to the exemplary embodiments, when the called party's communications devices 731 answers the incoming communication, the Simultaneous Ring Called Party Identification Module 125' accesses or otherwise queries the answering communications device for a called party identifier (e.g., the Simultaneous Ring Called Party Identifier) and matches the called party identifier with the database 729 of Simultaneous Ring Called Party Identification profiles to retrieve or otherwise generate both (1) the Simultaneous Called Party Identification signal 835 to communicate to the calling party's communications device 710 and (2) the Called Party ID Status to communicate to a selected, non-answering called party's communications device that subscribes to the simultaneous ring service shown as cellular phone 732. Consequently, other communications addresses associated with the simultaneous ring service receive a CallerID formatted message that identifies a status or disposition of the incoming call. For example, FIG. 13 illustrates a schematic of a CallerID device 1300 coupled with a called party's non-answering communications device shown as cellular phone 732. The CallerID device 1300 of FIG. 13 includes similar components of the CallerID device 900 of FIG. 9; however, the CallerID device 1300 includes a display 1345 that includes the answering called party's communications address shown as "571-345-6780 A" ("A" denotes answered) and also includes the calling party's communications address shown as "831-234-5678 C" ("C" denotes calling communications address). Consequently, the CallerID device 1300 of FIG. 13 displays a current status that includes both the answered called party identifier and the calling party's communications address so that other communications addresses of the simultaneous ring service have access. Further, the CallerID device 1300 may display the Called Party ID status to a memory component of the CallerID device 1300 or to a remote database (not shown).

According to further exemplary embodiments, the calling party's communications device may include a personal digital assistant (PDA), a Voice over Internet Protocol (VOIP) phone, a modem, an interactive pager, a Global Positioning System (GPS) device, a digital musical recorder device, any computer system utilizing a digital signal processor, an interactive television, a Plain Old Telephone System (POTS) phone, and/or a computer. Regardless of the calling party's communications device that receives the Simultaneous Called Party Identification signal 235, this information may need to be formatted accordingly for the calling party's communications device (including audio, text (e.g., ASCII), video, other digital formats, and combination thereof). Accordingly, a communications device interface and the Simultaneous Ring Called Party Identification Module 125 of the communications network has the intelligence for appropriate formatting of the Simultaneous Ring Called Party Identification signal for communicating to the calling party's communications device. For example, if the calling party's communications device uses the Wireless Application Protocol (WAP) technique, then the Simultaneous Called Party Identification signal is formatted using the Wireless Mark-up Language (WML) and must be configured for CallerID standards known in the art. The Wireless Mark-up Language (WML) and the WAP technique are known and will not be further described. This is a description of a solution for a specific wireless protocol, such as WAP. This solution may be clearly extended to other wireless protocol, such as i-mode, VoiceXML (Voice eXtensible Markup Language), Dual Tone Multi-Frequency (DTMF), and other signaling means. Alternatively, the Simultaneous Called Party Identification signal may be formatted and/or otherwise configured for presentation by an application and/or componentry of the calling party's communications device.

The Simultaneous Ring Called Party Identification application (shown as reference numerals 125, 125', and 125" in FIGS. 1-5, 7-8, and 12) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the embodiments, allow the Simultaneous Ring Called Party Identification application to be easily disseminated.

The Simultaneous Ring Called Party Identification application may also be physically embodied on or in any addressable (e.g., HTTP, I.E.E.E. 802.11, Wireless Application Protocol (WAP)) wire line or wireless device capable of presenting an IP address. Examples could include a computer, a wireless personal digital assistant (PDA), an Internet Protocol mobile phone, or a wireless pager.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method, comprising:
   receiving, by a system including a processor, a request from an originating communication device, the request directed to a plurality of recipient communication devices;
   obtaining, by the system, a profile according to the request;
   identifying, by the system, a plurality of communications addresses from the profile, each communications address in the plurality of communications addresses associated with a recipient communication device in the plurality of recipient communication devices;
   initiating, from the system, a communication request directed to each of the plurality of recipient communication devices according to the plurality of communications addresses;
   identifying, by the system, a communications address from the plurality of communications addresses, the communications address associated with an accepting communication device of the plurality of recipient communication devices that accepted the communication request; and
   sending, by the system, the communication address associated with the accepting communication device that accepted the communication request to the originating communication device.

2. The method of claim 1, wherein the originating communication device initiates a communication session according to the communication address associated with the accepting communication device.

3. The method of claim 1, wherein the initiating of the communication request further comprises excluding from the communication request an originating communications address associated with the originating communication device.

4. The method of claim 1, wherein the initiating of the communication request further comprises facilitating an alert directed to the plurality of recipient communication devices.

5. The method of claim 1, wherein the initiating of the communication request further comprises facilitating an alert directed selectively to the plurality of recipient communication devices.

6. The method of claim 1, further comprising determining one or more other communications addresses of the plurality of communications addresses, the one or more other communications addresses corresponding to one or more other recipient communication devices of the plurality of recipient communication devices that did not accept the communication request.

7. The method of claim 1, further comprising retrieving an alternate identifier selected according an originating communications address associated with the originating communication device to identify the communications address of the accepting communication device.

8. The method of claim 7, further comprising sending the alternate identifier to the originating communication device.

9. An apparatus, comprising:
   a processor; and
   a memory device storing executable instructions that, when executed by the processor, facilitate performance of operations, the operations comprising:
   receiving a communications request from an originating communication device, the communications request directed to a recipient utilizing a plurality of recipient communication devices;
   identifying a profile associated with the communications request;
   retrieving a plurality of communications addresses from the profile that are associated with the plurality of recipient communication devices;
   directing the communications request to each of the plurality of recipient communication devices according to the plurality of communications addresses;
   identifying a communications address from the plurality of communications addresses associated with a recipient communication device of the plurality of recipient communication devices that acknowledged the communication request; and
   sending the communications address associated with the recipient communication device acknowledging the communications request to the originating communication device.

10. The apparatus of claim 9, wherein the originating communication device initiates a communication session according to the communications address of the recipient communication device.

11. The apparatus of claim 9, wherein the directing of the communications request further comprises preventing an originating communications address from being provided to the plurality of recipient communication devices.

12. The apparatus of claim 9, wherein the directing of the communications request further comprises directing the communications request to the plurality of recipient communication devices.

13. The apparatus of claim 9, wherein the directing of the communications request further comprises selectively directing the communications request to the plurality of recipient communication devices.

14. The apparatus of claim 9, further comprising identifying one or more other communications addresses of the plurality of communications addresses, the one or more other communications addresses corresponding to one or more other recipient communication devices of the plurality of recipient communication devices that did not acknowledge the communications request.

15. The apparatus of claim 9, further comprising retrieving an alternate identifier selected according an originating communications address associated with the originating communication device to identify the communications address associated with the recipient communication device.

16. The apparatus of claim 15, further comprising presenting the alternate identifier at the originating communication device.

17. A non-transitory machine-readable storage medium, comprising executable instructions that, when executed by a processor, facilitate performance of operations, the operations comprising:

receiving a request from a source communication device directed to a user associated with a plurality of recipient communication devices;

identifying a profile associated with the request;

obtaining a plurality of communications addresses from the profile that are associated with the plurality of recipient communication devices;

sending a communication request to each of the plurality of recipient communication devices according to the plurality of communications addresses;

identifying a communications address from the plurality of communications addresses, the communications address associated with a recipient communication device of the plurality of recipient communication devices that responded to the communication request; and sending the communications address associated with the recipient communication device that responded to the communication request to the source communication device.

18. The non-transitory machine-readable storage medium of claim 17, wherein the source communication device initiates a communication session according to the communications address of the recipient communication device.

19. The non-transitory machine-readable storage medium of claim 17, wherein the sending the communication request further comprises directing the communication request to the plurality of recipient communication devices.

20. The non-transitory machine-readable storage medium of claim 17, wherein the sending the communication request further comprises selectively directing the communication request to the plurality of recipient communication devices.

* * * * *